United States Patent [19]
Hite

[11] 3,870,148
[45] Mar. 11, 1975

[54] CIRCULAR SAW BLADE CONVEYANCE BOX

[76] Inventor: Harold H. Hite, Rd.-2-Co. Rd.-40, Pataskala, Ohio 43062

[22] Filed: Feb. 7, 1973

[21] Appl. No.: 330,269

[52] U.S. Cl............... 206/372, 206/309, 217/7
[51] Int. Cl................ B65d 25/04, B65d 85/54
[58] Field of Search ......... 217/7; 206/372, 349, 309

[56] References Cited
UNITED STATES PATENTS

| | | | |
|---|---|---|---|
| 418,507 | 12/1889 | Dowe | 217/7 |
| 1,278,539 | 9/1918 | Wilking | 206/309 |
| 1,661,121 | 2/1928 | Huson | 206/372 |
| 1,926,162 | 9/1933 | Moberly | 217/7 |
| 2,469,749 | 5/1949 | Spangler et al. | 217/7 X |
| 2,601,426 | 6/1952 | Baumann | 206/349 |

*Primary Examiner*—Leonard Summer

[57] ABSTRACT

A carrying case for storing a multiple number of circular saw blades. This device consist primarily of a main body portion having a central separator wall with removable inserts for providing space means for receiving individual saw blades, the upper portion of the device having a hingeable cover with hasp and eye means for locking the device.

1 Claim, 3 Drawing Figures

PATENTED MAR 11 1975　3,870,148

CIRCULAR SAW BLADE CONVEYANCE BOX

This invention relates to carrying cases and more particularly to a circular saw conveyance box.

It is therefore the principal object of this invention to provide a circular saw conveyance box which will be of such structure so as to store, safely, a plurality of circular saw blades.

Another object of this invention is to provide a conveyance box of the type described which will serve to prevent the saw teeth from becoming damaged.

Another object of this invention is to provide a device of the type described which will serve to keep the saw blades dry, thus preventing rust.

Still another object of this invention is to provide a device of the type described which will enable the user to keep the saw blades in proper order so as to enable the user to easily select the proper blade in a minimum amount of time and the storage of the blades within the confines of the device will serve to increase the life of the blades.

Other objects of the invention are to provide a device of the type described which will be simple in design, inexpensive to manufacture, rugged in construction, easy to use and efficient in operation. These and other objects will become readily evident upon a study of the following specification together with the accompanying drawing wherein.

Figures 1, 2:
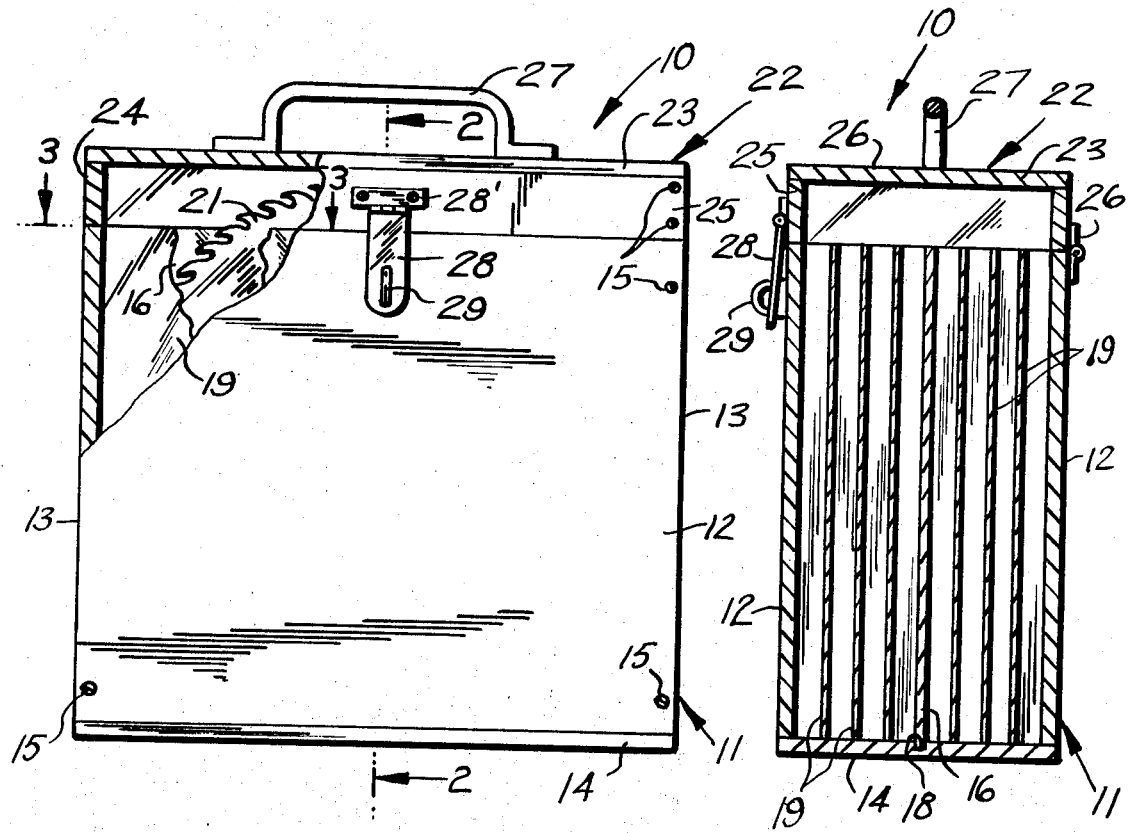
FIG. 1 is a front view of the present invention shown in elevation and partly broken away.
FIG. 2 is a cross-sectional view taken along the line 2—2 of FIG. 1, showing the saw blades removed therefrom for the sake of clarity.
Figure 3:
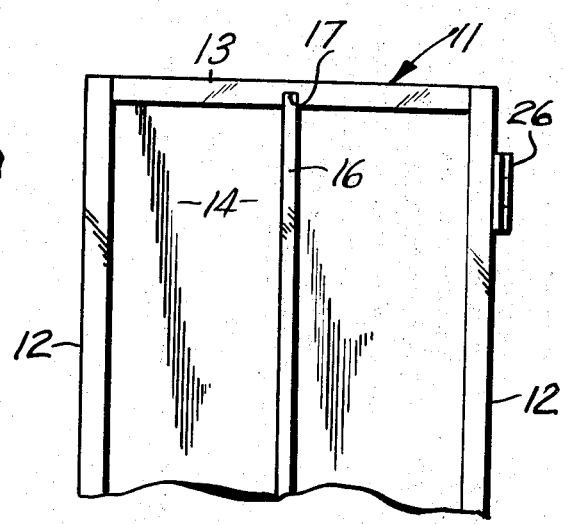
FIG. 3 is an enlarged cross-sectional view taken along the line 3—3 of FIG. 1, showing the separator and the saw blades removed therefrom.

According to this invention, a circular saw conveyance box 10 is shown to consist of a rectangular container 11 having parallel spaced apart side walls 12 secured to parallel spaced apart end walls 13. A bottom wall 14 is secured to side walls 12 and end walls 13 by suitable screw fasteners 15. Side walls 12 and end walls 13 are also secured to each other by screw fasteners 15. On the interior of container 11 is located a central rectangular wall 16 which is carried within grooves 17 of end walls 13 and grooves 18 of bottom wall 14. A plurality of inserts 19 are carried on both sides of the central wall 16 and define spaces 20 which form compartment means for receiving a plurality of circular saw blades 21. A cover 22 for container 11 includes a rectangular top wall 23 secured to end walls 24 and side walls 25 by means of screw fasteners 15. A pair of spaced apart hinges 26 are secured to one of the side walls 12 of container 11 and are secured to one of the side walls 25 of cover 22 by suitable fasteners (not shown). A carrying handle 27 is fixedly secured to the top wall 23 of cover 22, and serves as hand grip means for carrying devise 10. A hasp 28 is secured by screw fasteners 28' to side wall 25 of cover 22, opposite that carrying the hinges 26 and hasp 28 is hingeably received on the eye 29 secured fixedly to side wall 12, the hasp 28 and the eye 29 serving as a means for receiving a pad lock or the like.

In use, the saw blades 21 are placced in any desired order within the spaces 20 so as to be readily available to the user when desired.

What I claim is:

1. A circular saw blade conveyance box, comprising a rectangular container for the storage of a plurality of circular saw blades, a pair of parallel spaced apart side walls, a pair of parallel spaced apart end walls and a bottom wall carried by said container defining compartment means for a plurality of inserts, a central separator wall carried within said container serving to provide two compartments within said container, a plurality of circular saw blades in each compartment, a plurality of self-supporting inserts loosely received in said compartments and unconnected to said container, each insert being of substantial thickness and located intermediate two adjacent blades for spacing said blades, said partition and said inserts having a height less than the height of said saw blades for facilitating visual observation and grasping of the blades, a rectangular cover carried by said container, with handle grip means and fastener means for locking said container and hinge means carried by said container and said cover for rendering said cover hingeable thereto.

* * * * *